United States Patent [19]

Alter

[11] Patent Number: 4,798,360
[45] Date of Patent: Jan. 17, 1989

[54] BEVERAGE CADDY APPARATUS

[76] Inventor: Sheldon Alter, 84 Butterworth Dr., Attleboro, Mass. 02703

[21] Appl. No.: 74,577

[22] Filed: Jul. 17, 1987

[51] Int. Cl.$^4$ .............................................. A47K 1/08
[52] U.S. Cl. .................................. 248/311.2; 248/151
[58] Field of Search .................. 248/311.2, 205.2, 151, 248/146, 142; 296/37.8, 37.1, 37.12, 37.5; 211/74, 40, 41; 108/44, 45, 46

[56] References Cited

U.S. PATENT DOCUMENTS

| | | | |
|---|---|---|---|
| 2,723,037 | 11/1955 | Matesic | 211/74 |
| 2,741,521 | 4/1956 | Bell et al. | 108/44 X |
| 2,825,611 | 3/1958 | Aynesworth | 108/45 |
| 2,889,097 | 6/1959 | Broehl | 108/44 X |
| 2,903,311 | 9/1959 | Earhart | 211/74 X |
| 2,926,828 | 3/1960 | Kuddie | 248/311.2 X |
| 3,039,616 | 6/1962 | Proffit | 211/74 X |
| 3,784,142 | 1/1974 | O'Brien | 248/311.2 |
| 3,893,569 | 7/1975 | Hoch | 211/74 |
| 4,087,126 | 5/1978 | Wynn | 296/37.8 |
| 4,396,123 | 8/1983 | Swan | 211/40 |
| 4,434,961 | 3/1984 | Hoye | 248/311.2 |
| 4,512,503 | 4/1985 | Gioso | 296/37.8 X |
| 4,577,788 | 3/1986 | Richardson | 108/44 X |

Primary Examiner—Ramon S. Britts
Assistant Examiner—Karen J. Chotkowski
Attorney, Agent, or Firm—John A. Haug

[57] ABSTRACT

A beverage caddy particularly adapted for use in automotive vehicles having a center console is shown to include a tray portion mounted between a pair of relatively narrow in depth but long in height side walls. A base portion is adapted to be received in the bottom portion or floor of the automotive console and removable attachment means is disposed on the rear top portion of the caddy to securely mount the caddy immediately adjacent to the dash of the vehicle with the tray located within the field of vision of a person operating the vehicle.

12 Claims, 3 Drawing Sheets

BEVERAGE CADDY APPARATUS

BACKGROUND OF THE INVENTION

This invention relates generally to apparatus for holding beverage containers and more particularly to such apparatus for holding containers in automotive vehicles.

Many people, when traveling in automotive vehicles, enjoy drinking a beverage. Whether the vehicle is in motion or not there is a need to have a support for the beverage container which is secure as well as advantageously located. Various devices for this purpose are available but all suffer from certain limitations. There are some, for example, which are adapted to be mounted on top of the dash of the vehicle underneath the windshield. In this location the view of the operator is somewhat obstructed by the device as well as the beverage containers disposed in the device. Further in the event of spillage the liquid can easily fall on the operator or passenger. An even greater limitation however, is the fact that when the beverages are hot the windshield tends to fog up thereby causing serious safety problems.

Other devices are adapted to fit on the door of the vehicle with a tab portion received between the window and the window seal. This device can be useful when the car is stationary but serves as an obstruction for the operator when the car is in motion. Further, in many cars the window seal is too tight to allow easy reception of the tab portion.

Still other devices are adapted to fit on top of the raised centrally located rounded floor portion. However, in this location the containers are located in a position that requires the operator to take his eyes off the road to see where to pick up or put down a beverage container. Another limitation for this type of device is the fact that in many of the vehicles currently being built the transmission lever and parking brake handle occupy the space where these devices would otherwise be placed.

SUMMARY OF THE INVENTION

Among the several objects of the invention is the provision of a beverage container caddy which is removably received in an automotive vehicle and adapted to locate beverage containers within the field of vision of a person operating the vehicle. Another object is the provision of beverage container caddy apparatus which is particularly suitable for vehicles which have center console designs and floor mounted transmission levers. Yet another object is the provision of such apparatus, the parts of which are separable for convenient storage, and such apparatus which esthetically pleasing yet inexpensive.

Various additional objects and advantages of the present invention will become readily apparent from the following detailed description and accompanying drawings.

Briefly, the above objects are realized by providing generally rectangular tray having a depth sufficiently long to accommodate a container receiving aperture and a width extending from one side end to an opposite side end to accommodate preferably two container receiving apertures. According to a feature of the invention a lip portion extends above the tray surface about its outer periphery and about the periphery of the container receiving apertures. Suitable attachment means, such as integrally attached lugs having split ends extend out from the side end portions of the tray to facilitate attachment to side walls.

A pair of side walls are provided with each having a first riser portion with a height at least approximately five inches to locate the tray at an elevated location relative to the surface on which the caddy apparatus is disposed and a second integrally attached tray mounting portion preferably provided with two vertically extending rows of lug receiving apertures so that the tray's position can be adjustably located. The bottom portion of each riser portion is received in a groove of a base member which is preferably wedge shaped to enhance stability of the caddy.

According to a feature of the invention a stop surface depends downwardly from the tray to limit insertion of a container in a container receiving aperture. The stop surface can be an inverted "T" attached to the central portion of the underside surface of the tray or it could be in the form of a pair of generally "L" shaped members, one depending from each end of the tray. According to a feature of the invention the "L" shaped members may be pivotably mounted so that when not required for supporting a container a member can be rotated so that the stop surface extends parallel to the side wall. A variation provides a two part pivotable stop surface, one part can be pivoted to lie alongside the other part when not in use.

According to another feature of the invention removable attachment means, such as strips of velcro, are placed on selected rear surface portions of the side walls or tray with matching strips placed on the front surface of the dash of the vehicle to securely but removably mount the caddy apparatus in the vehicle.

According to yet another feature of the invention, if desired, mounting means for a plurality of tape cassettes are provided on the base.

BRIEF DESCRIPTION OF THE DRAWINGS

In the accompanying drawings in which several of the preferred embodiments are illustrated.

Figure 1:
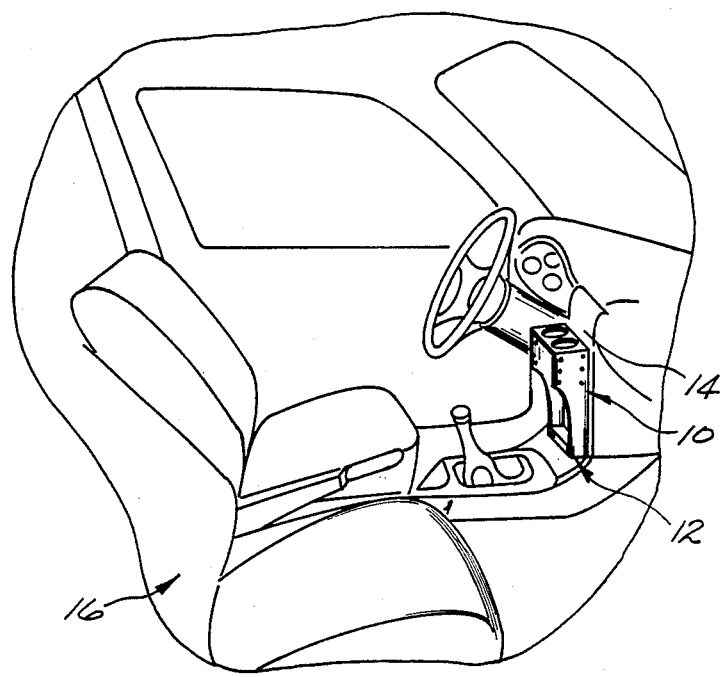
FIG. 1 is a pictorial representation of a typical cockpit portion of an automotive vehicle showing a beverage container caddy made in accordance with the invention.

Dimensions of certain parts as shown in the drawings may have been modified or exaggerated for purpose of clarity of illustration.

DESCRIPTION OF PREFERRED EMBODIMENTS

Turning now to the drawings, numeral 10 refers to a beverage container caddy made in accordance with the invention. As seen in FIG. 1 caddy 10 rests on top of the bottom surface of the center console 12 and is attached to the front portion 14 of the dash of the automotive vehicle 16 extending transversely across a portion of the console.

Figure 2:
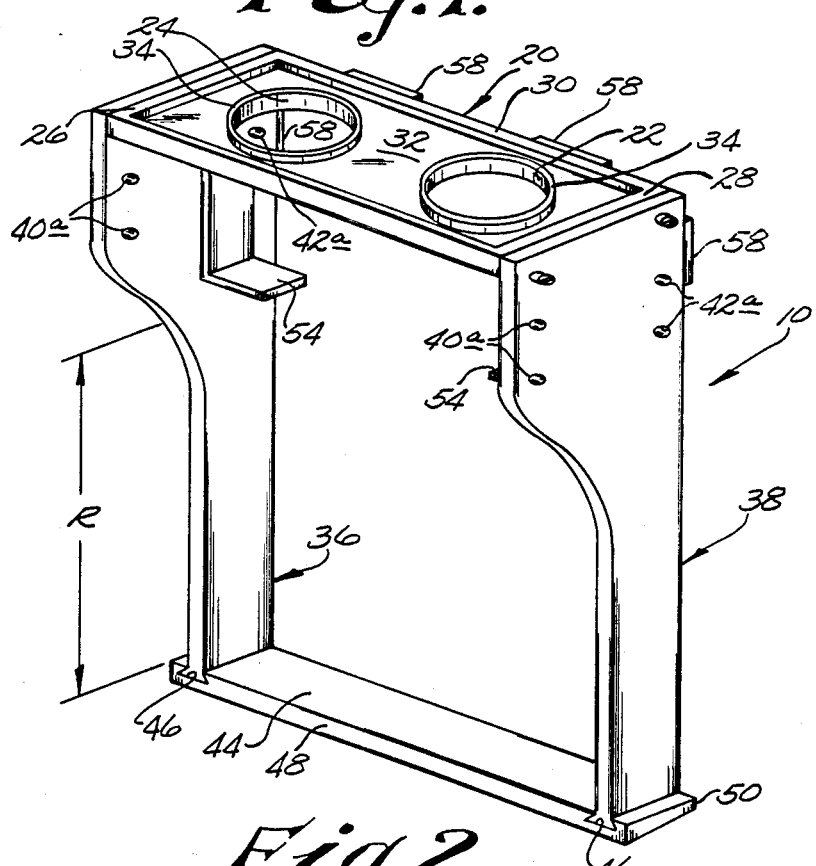
FIG. 2 is an enlarged pictorial representation of the caddy shown in FIG. 1.

With particular reference to FIGS. 1 and 2 caddy 10 comprises a tray 20 formed of any suitable material such a moldable plastic, either translucent or colored as selected. Tray 20 is formed with a depth sufficient to accommodate at least one beverage container receiving aperture 22 or 24 and wide enough from one side end 26 to an opposite side end 28 to accommodate preferably two such apertures 22 and 24. Preferably a lip 30 extends upwardly from surface 32 of the tray and extends about the outer periphery of tray 20. A similar lip 34, preferably slightly less in height than lip 30, extends upwardly about the apertures 22, 24. This provides a convenient surface for placing coins, tokens or the like without having them fall off the tray.

Side walls 36, 38, which may be formed of the same material as tray 20, each comprises a first riser portion having a height R which serves to locate the tray portion at a location which is within easy reach of the operator of the vehicle and within his field of vision so that he does not have to take his eyes off the road while he is reaching for a container or while he is placing a container in a container receiving aperature.

Preferably side walls 36, 38 each has a pair of vertically extending lug receiving apertures 40a, 42a formed in a second integrally attached tray mounting portion of the side walls. Tray 20 is provided with suitable attachment means such as integrally formed lugs 40b, 42b extending outwardly from each side end of tray 20. Lugs 40b, 42b are of a size to be received in apertures 40a, 42a respectively and may be slotted at their distal end to provide a spring bias to firmly keep them in place in their respective apertures. Thus the tray can be adjusted in height to any of several vertically disposed positions by using the appropriate pairs of lug receiving apertures.

The tray mounting portion of the side walls have a depth which conforms to the depth of the tray and taper down from front to back to the riser portion which is considerably narrower than the tray mounting portion to minimize obstruction of access to the various controls behind the caddy as well as the transmission lever.

The bottom distal end portion of side walls 36, 38 are removably attached to base member 44 by suitable means such as grooves 46 extending from front to back on opposite end portions of the base. The bottom distal end portion may be conveniently flared and groves 46 may be formed in a complementary configuration so that the parts dovetail together for a secure connection.

In order to optimize stability of caddy 10, base 44 may be formed in a wedge like configuration with the front portion 48 thicker having greater height than the rear portion to provide more of a moment to maintain the top portion of the caddy toward the back thereof.

Strips of suitable attachment means such as velcro are placed on the rear surface of side members 36, 38 or tray 20 with complimentary strips placed on the front portion of the dash of the vehicle so that the caddy is securely mounted.

Although apertures by themselves are effective to mount conically configured containers of a selected size a stop surface is needed for cylindricalty shaped containers. As seen in dashed lines in FIG. 3 an inverted "T" 52 can be provided depending, in any convenient manner, from a central portion of the underside of tray 20 to provide a stop surface for both apertures 22 and 24. Alternatively, as seen in FIG. 2 a pair of "L" shaped stop surfaces 54 can be provided one depending from each end of tray 20. The "L" shaped surface provides increased access to the console through the caddy.

Figure 3:
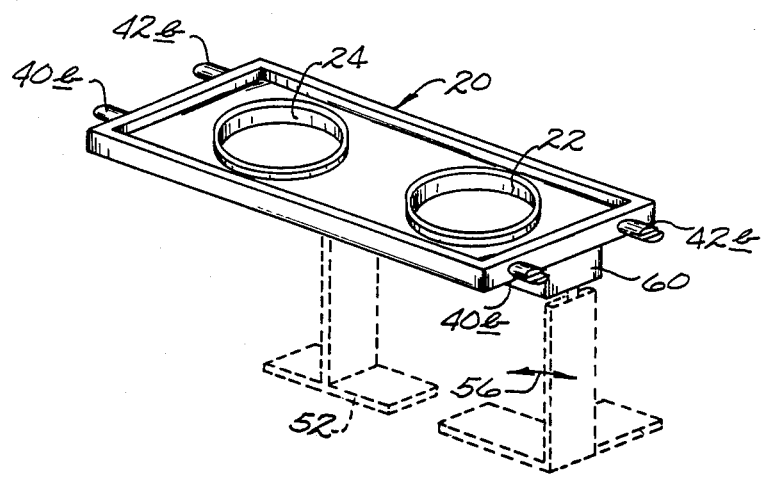
FIG. 3 is a pictorial view of the tray portion of the caddy showing the inverted "T" and "L" shaped stop surfaces in dashed lines.
Figure 4:
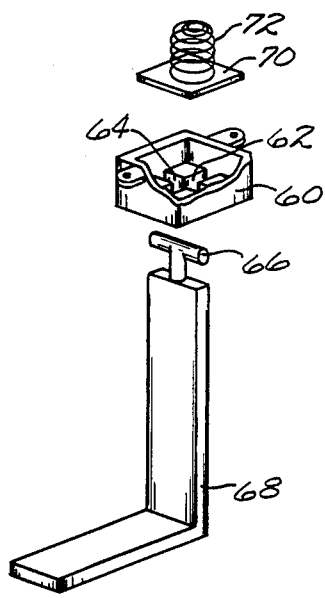
FIG. 4 is a blown apart pictorial view of a rotatable stop surface.

To enhance access through the caddy to a greater degree the "L" shaped stop surfaces may be pivotably mounted so that they can be rotated, when not being used, to extend parallel to the side walls as noted by the double ended arrow 56 in FIG. 3. As seen in FIG. 4 an indent mount 60 can be attached to the underside of tray 20 and is provided with intersecting grooves 62, 64. Cross member 66 attached to the top portion of "L" shaped stop member 68 extends through a hole (not shown) in the bottom of mount 60 and is received in groove 62 when it is desired to use it to support a container. Cover 70 is biased downwardly by spring 72 to maintain the cross member 66 securely in the groove. When it is desired to place the stop surface in parallel relation to the side wall member 68 is pushed up against the bias of spring 72 and rotated until cross member 66 is received in groove 64.

Figure 4A:
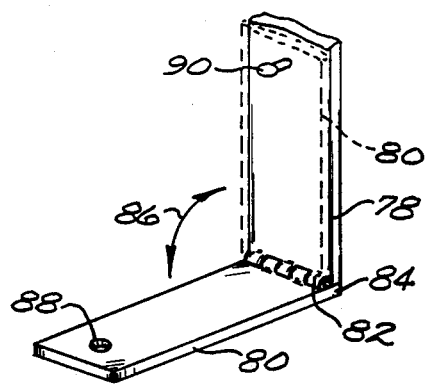
FIG. 4a is an alternative embodiment of a movable stop surface.
Figure 5:
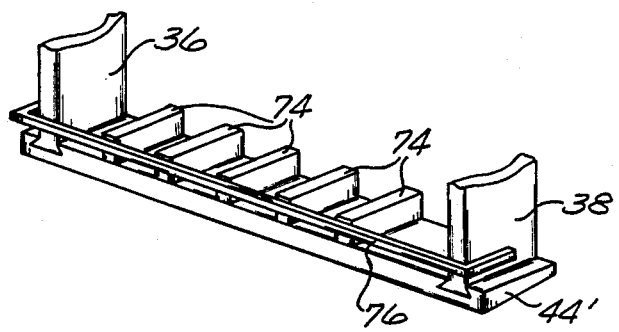
FIG. 5 depicts a modified base portion showing tape cassette mounting means.

Still another variation providing enhanced access through the caddy is shown in FIG. 4a. An "L" shaped stop member 78 is shown having a bottom stop surface 80 which is pivotably mounted thereto at 82 s that the stop surface can be pivoted upwardly as noted by the dashed lines so that it lies alongside member 78. An aperture 88 can be formed in stop surface 80 which is adapted to springingly receive knob 90 when the stop surface is rotated upwardly to maintain it in the up position when it is not in use. Stop surface 80 extends beyond the bottom end surface of member 78 so that it will butt against the end surface to limit downward movement of stop surface 80 to approximately 90 degrees relative to member 78. Preferably the length of surface 80 is selected so that when the surface is in the down position it extends substantially entirely across its respective beverage container receiving aperture.

If desired, the base can be provided with parallel ribs 74 extending from front to back and spaced apart a sufficient distance to receive tape cassettes for handy storage of several tapes. A retainer 76 is attached to side walls 36, 38 and extends transversely along the front of base 44' to serve as a stop surface for the cassettes to maintain them in position.

A caddy made in accordance with the invention has a top tray approximately 4 inches deep and 8 inches wide (from side end to side end). The rim 30 around the periphery of the tray extends 3/16 inch above surface 32 while rim 34 extends ⅛ inch above surface 32. Side walls taper to 2 inches in depth and the overall, height is approximately 11 inches. Side members 36 and 38 each has a first riser portion having a height approximately 5 inches indicated by R in FIG. 2 integrally attached to a tray mounting portion.

Although the invention has been described with respect to specific embodiments thereof, variations and modifications will become apparent to those skilled in the art. It is therefore, the intention that the appended claims be interpreted as broadly as possible in view of the prior art to include all such variations and modifications.

I claim:

1. Beverage container support apparatus particularly adapted for automotive vehicles having center consoles in which are disposed vehicle related controls and having a floor mounted transmission lever comprising, a tray portion extending transversely across and in front of a portion of the center console and having a depth sufficient to accommodate a beverage container receiving aperture, at least one container receiving aperture in the tray portion, stop surface means mounted on the apparatus to limit downward movement of a container received in the at least one beverage container receiving aperture, the stop surface means including a generally "L" shaped member, a cross member attached to the top of the "L" shaped member, a mount member mounted on the apparatus having first and second intersecting grooves formed therein, means to bias the cross member into the first groove to maintain the "L" shaped member in one rotational orientation, the "L" shaped member being movable against the bias so that the cross member can be moved out of the first groove enabling it to be rotated until the cross member is received in the second groove in a second rotational orientation, a pair of side members, one at each transverse end of the tray portion and connected thereto, the side members having a height sufficient to extend from a floor portion of the vehicle adjacent to and aligned with the console to place the tray portion within the field of vision of an operator of the vehicle looking through a windshield of the vehicle, base means connected to the bottom portion of the side members and adapted to be placed on the said floor portion of the vehicle, and attachment means disposed on the apparatus adapted to engage and attach the apparatus to the dash portion of the vehicle, the tray portion, side members and base means defining an open area therethrough to allow access to vehicle related controls behind the support apparatus, and the side members and base means being configured to provide access to the floor mounted transmission lever.

2. Beverage container support apparatus according to claim 1 in which the tray portion, side members and base are separable to facilitate compact storage.

3. Beverage container support apparatus according to claim 1 in which there are at lest two beverage container receiving apertures formed therein.

4. Beverage container support apparatus according to claim 1 in which the tray portion has a give depth, the side members decrease in depth from approximately the same as that of the tray portion to approximately half the said depth of the tray portion.

5. Beverage container support apparatus according to claim 4 in which the base means comprises a solid member having a wedge shaped configuration with the front portion having a greater height than the rear portion.

6. Beverage container support apparatus according to claim 1 further including tape cassette receiving grooves formed in the base means and further including a retainer extending above and in front of the base means extending between the side members to retain cassettes in their respective grooves.

7. Beverage container support apparatus according to claim 1 in which the side members are each provided with a pair of vertically extending lug receiving rows of apertures and the tray portion has a pair of lugs extending outwardly from each side end and aligned with the pair of vertically extending rows to permit vertical adjustment of the tray portion.

8. Beverage container support apparatus according to claim 1 further including a lip vertically extending above the surface of the tray portion, the lip extending about the periphery of the tray portion and the at least one beverage container receiving aperture.

9. Beverage container support apparatus according to claim 4 in which the side members each has a bottom distal end portion which is outwardly flared and grooves extending from front to back are formed in the base means matching the configuration of the distal end portions of the side members so that the distal end portions of the side members can be slid into the grooves to securely mount the side members to the base.

10. Beverage container support apparatus according to claim 1 in which the attachment means comprises strips of velcro attached to the rear surface portion of at least one of the side members and the tray portion and complimentary strips are adapted to be placed on the front portion of the dash of the vehicle.

11. Beverage container support apparatus according to claim 1 in which the side members are each formed with a first riser portion having a height R at least approximately 5 inches and an integrally attached tray mounting portion.

12. Beverage container support apparatus according to claim 11 in which the tray portion has a given depth, the side members taper from a depth approximately the same as that of the tray portion to approximately half the said depth with generally the entire height of the riser portion having a depth equal to half the said depth.

* * * * *